US005901828A

United States Patent [19]

Monie

[11] Patent Number: 5,901,828

[45] Date of Patent: May 11, 1999

[54] DEVICE FOR RECEIVING OR REJECTING COINS OR CIRCULAR TOKENS

[75] Inventor: Jean Monie, Scionzier, France

[73] Assignee: Asia Euro Industries, Plan-Les-Ouates, Switzerland

[21] Appl. No.: 08/946,214

[22] Filed: Oct. 7, 1997

[30] Foreign Application Priority Data

Oct. 24, 1996 [FR] France .................................... 9613207

[51] Int. Cl.[6] .............................. G07F 1/04; H04M 17/02

[52] U.S. Cl. ............................................ 194/346; 379/150

[58] Field of Search ............................ 194/346; 310/330, 310/331, 332; 379/150, 151, 152, 153

[56] References Cited

U.S. PATENT DOCUMENTS 2,032,517 3/1936 Wheeler ................................. 194/346

4,625,137 11/1986 Tomono ................................. 310/317

FOREIGN PATENT DOCUMENTS 0147112 7/1985 European Pat. Off. .

0052043 8/1985 European Pat. Off. .

2494011 4/1982 France .

*Primary Examiner*—F. J. Bartuska

*Attorney, Agent, or Firm*—Browdy and Neimark

[57] ABSTRACT

This invention relates to a device for receiving or rejecting coins or circular tokens, for example for coin- or token-operated telephone apparatus. It comprises, for the chute down which the coins drop, a pivoting flap of which the state, retracted or not due to the weight of an incidental coin, is determined by a piezoelectric element, such as a bimorph piezoelectric plate, which serves, or not, as anti-pivot support for this flap.

5 Claims, 2 Drawing Sheets

DEVICE FOR RECEIVING OR REJECTING COINS OR CIRCULAR TOKENS

FIELD OF THE INVENTION

The present invention relates to a device for receiving or rejecting coins or circular tokens, said device equipping an apparatus dispensing products, for example drinks, or offering services, for example telephone services, which functions by introducing coins or tokens in a slot paying mechanism incorporated in the machine.

BACKGROUND OF THE INVENTION

Coin- or token-operated telephone apparatus cannot be connected to the electricity supply network, as the majority of legislations prohibit it for obvious imperatives of protection of the telephone network. The only source of energy available for operating the slot paying mechanism of a telephone apparatus of this type therefore remains that of the telephone network itself, which, unfortunately, cannot furnish power as high as that of the 220 or 230 volt electricity network. In fact, the electrical power that the telephone network can furnish for operating the electro-mechanical elements of a slot paying mechanism of a telephone apparatus generally does not exceed some tens of milliwatts.

Document FR-A-2 494 011 can be cited as state of the art, which discloses a coin accumulator-receiver device which comprises a rejection member using an electromagnet with solenoid plunger acting as retractable stop for retaining the coins accumulated one behind the other or one on the other in an inclined slideway.

However, in order to be actuated, an electromagnet requires electrical power which cannot be considered as very low. Exploitation of such a device is therefore necessarily limited.

In addition, its response time is relatively long with respect to the requirements of rapidity which are required by the electronic sorting system.

Document EP-A-0 147 112 may also be cited as state of the art, which discloses, with reference to FIGS. 32 and 33 thereof, a coin-processing device comprising:

a runway, inclined with respect to the horizontal and in which the coins or tokens arrive one behind the other after having been tested by a selection member placed upstream and delivering an electric signal for controlling reception or rejection of each coin or token, and a retractable trap forming, at the location of the runway where it is placed, the bottom of said runway, this trap being actuated via a piezoelectric element whose deformation by bending is generated via said electric control signal, with the result that the coins or tokens are directed towards a rejection path when this trap is retracted, while, on the contrary, they continue their path on the runway, beyond this trap, when it has not retracted, i.e. when it remains in rest position.

The present invention has for its object a device of this latter type, which is particularly simple and reliable to produce.

SUMMARY OF THE INVENTION

To that end, it relates to such a device, characterized in that:

said retractable trap is a flap pivoting about a hinge parallel to the runway and returned into its rest position by an elastic member whose return force is less than the weight of a coin or token, and said piezoelectric element is positioned beneath this pivoting flap, perpendicularly to the position of rest of this flap, but so as not to hinder its pivoting when the assembly is at rest and on the contrary so as to slide beneath this flap, in order to serve as support therefor preventing it from pivoting, when it receives a signal controlling reception, while it returns to its rest position, in that case releasing the flap, when it receives a signal controlling rejection.

This piezoelectric element is advantageously a bimorph piezoelectric plate.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
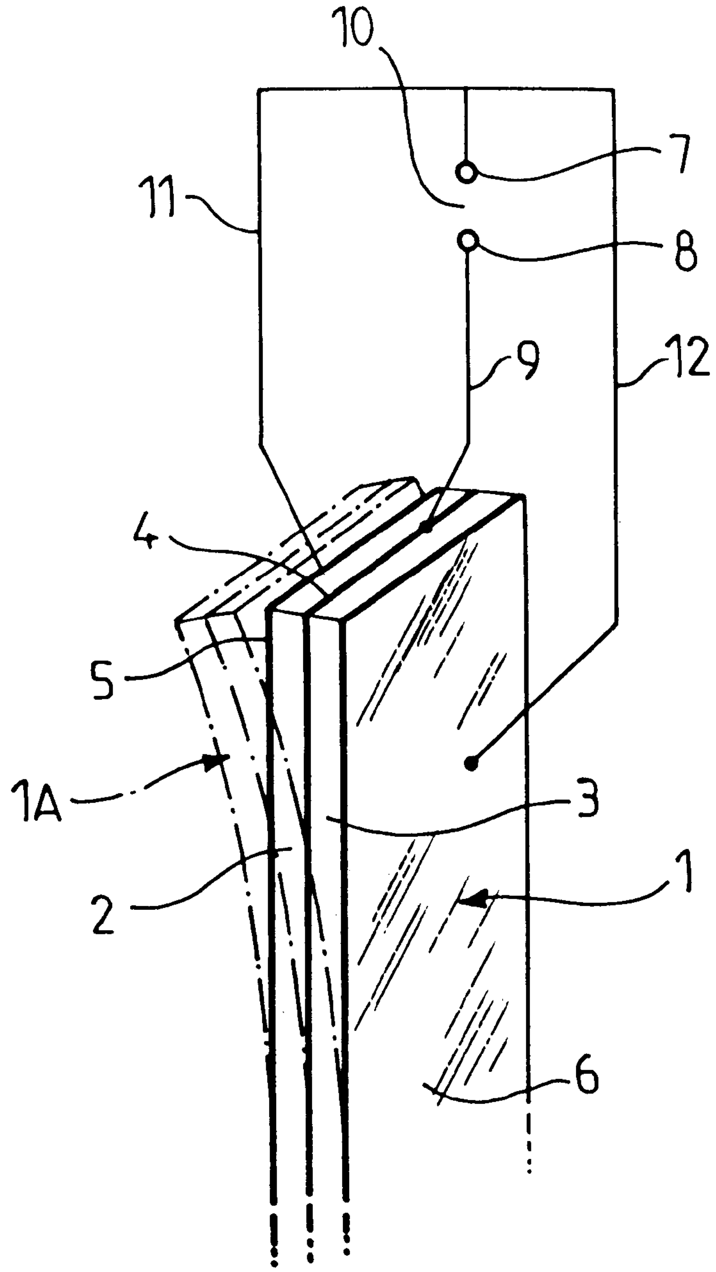
FIG. 1 is a brief reminder of the constitution and functioning of the bimorph piezoelectric plate used in this embodiment.

Referring now to the drawings, and firstly to FIG. 1, reference 1 designates a conventional bimorph piezoelectric plate obtained by assembling two ceramic piezoelectric plates 2, 3 which are cemented one on the other, with the interposition of a thin median metal plate 4 which forms the inner electrode of the bimorph 1, and which are capable of receiving opposite polarizations.

Two thin outer metal electrodes 5, 6 of the same length and width as the ceramic plates 2, 3 as well as the central electrode 4, are then cemented on each of the respective faces of the bimorph 1. The median electrode 4 is connected, by an electric connection wire 9, to a first terminal 8 of a source of D.C. voltage 10, but of reversible polarity under outside control, while the two outer electrodes 5 and 6 are respectively connected, by respective connection wires 11 and 12, to the other terminal 7 of this D.C. source 10.

By applying between terminals 7 and 8 a D.C. voltage of a first polarity, the bimorph plate 1 is deformed by bending in a first direction to take, if it is fixed at its lower end and left free at its upper end, the lateral position designated in FIG. 1 by reference 1A. For a bimorph plate with a length of 35 mm and a thickness of 0.60 mm, the free upper face of this plate will then move (towards the left in the drawing) over a distance of the order of 0.25 to 0.5 mm depending on the quality of the electric material and the amplitude of the D.C. voltage applied.

The piezoelectric materials used here are remanent elements which move virtually instantaneously (in about a millesecond, to give an idea) from position 1 to position 1A when a short control pulse (of 1 to 3 milliseconds of width for example) is applied thereto by the source 10, but which then remain, by mechanical memory effect, in this position of lateral deviation 1A for a relatively long time, currently of the order of several minutes, if no more voltage is then applied thereto.

On the other hand, if, from this position of lateral deviation 1A, there is applied to this bimorph element and via source 10 an equally brief control pulse whose polarity is opposite the first and of substantially the same amplitude, this bimorph returns virtually instantaneously (there again, in about a millisecond) to its initial position 1. This element behaving as a capacitance, the simple fact of short-circuiting points 7 and 8, in the absence of supply 10, provokes discharge of said capacitance and the result obtained is identical. The bimorph returns virtually instantaneously to its initial position.

It is this mode of functioning which is used in the present invention.

Figure 2:
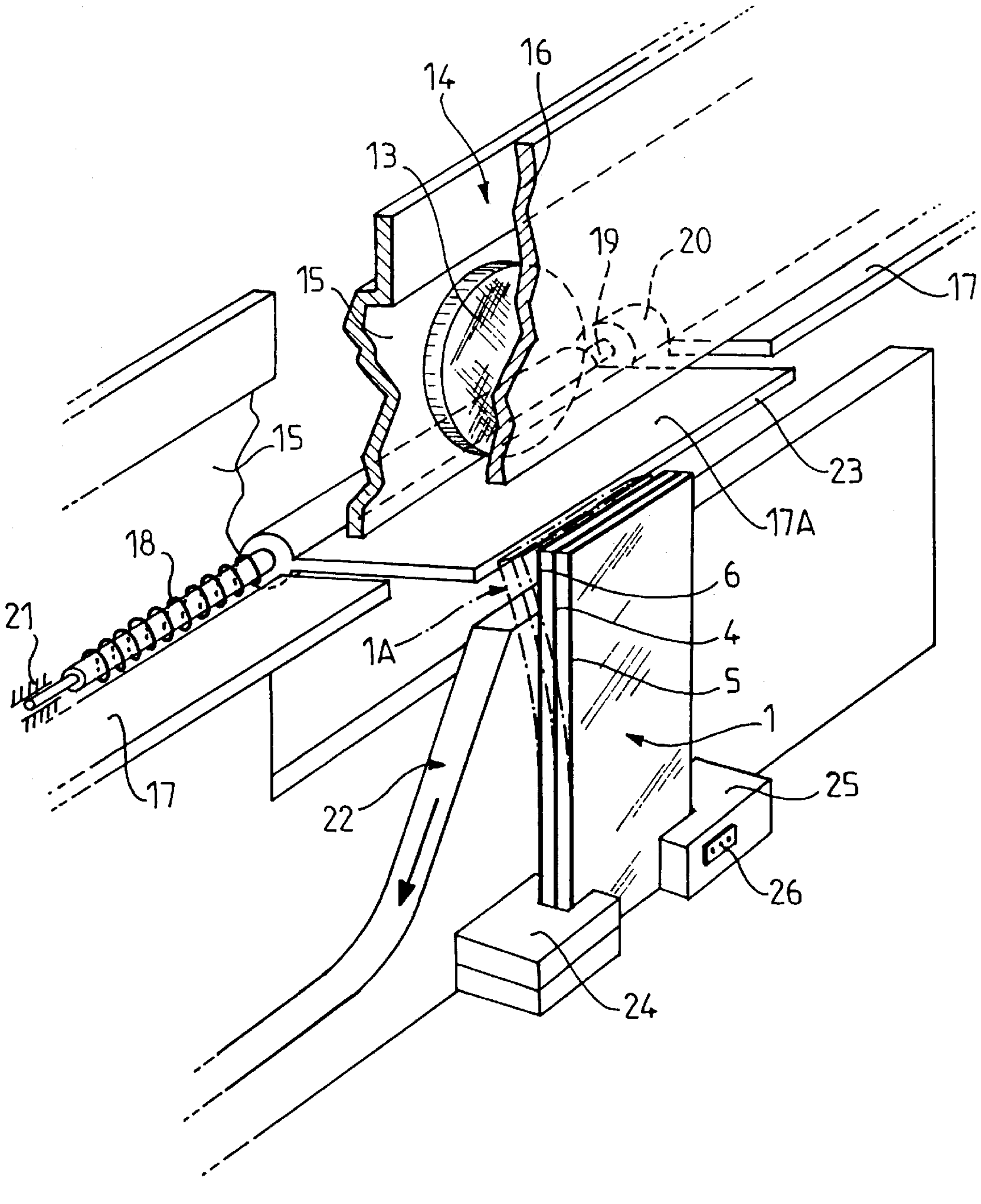
FIG. 2 is a partial perspective view of this embodiment, with parts torn away.

Referring now to FIG. 2, it is question of a device for receiving or rejecting coins 13 which arrive one behind the other in an inclined chute 14 here composed of two lateral, substantially vertical cheeks 15 and 16 and a bottom plate 17 which is inclined by some tens of degrees with respect to the horizontal. The width of the chute 14 is slightly greater than the width of the coins 13, so that they can roll therein without difficulty.

The coins 13 may, of course, also be circular tokens.

The selection, or sorting, of the coins 13—viz. good and therefore to be received, or bad and therefore to be rejected—is basically effected with the aid of a pivoting flap 17A which constitutes the bottom 17 of the chute 14 in the coin-sorting zone.

Flap 17A is normally returned into position of alignment with all the bottom 17, in the position of FIG. 2, by an elastic return spring 18. It rotates about a shaft 19 which is outside the chute 14 and parallel thereto, so that, as shown, the flap 17A comes into upper abutment against the two lower edges of the two cheeks 15, 16 of this chute. Shaft 19 is borne by end bearings 20, 21.

The return force of the spring 18 is weak enough for the flap 17A to pivot downwardly, rotating about shaft 19, under the weight of an incidental coin 13. In that case, the coin 13 drops in an evacuation chute 22 and is thus evacuated towards the outside. In order to render the drawing clearer, the front cheek of this evacuation chute 22 has not been shown in FIG. 2.

As shown, a bimorph piezoelectric plate 1 according to FIG. 1 is positioned upright, parallel to the chute 14 and close to the free end 23 of the pivoting flap 17A, at a distance therefrom which, being for example of the order of 0.1 mm, is sufficient to allow the flap 17A to pivot freely when this bimorph 1 does not receive polarization D.C. voltage.

The bimorph plate 1 is fixed in its lower part in holding jaws 24, 25. A three-point socket 26 allows the connection, according to FIG. 1, of the three electrodes 4, 5, 6 of the bimorph plate 1.

It should be noted that, when the polarization is applied in the direction which causes the bimorph plate to deviate in the direction of flap 17A, i.e. towards its position 1A, this plate will slide, by its upper free edge, beneath the free edge 23 of this pivoting flap 17A and it then serves as support which prevents the flap 17A from pivoting downwardly under the weight of an incidental coin 13. This incidental coin then rolls over the flap 17A which is maintained in alignment with the bottom 17 thanks to this support 1A, and it continues its path in the chute 14, finally arriving in the receiving device provided downstream.

Functioning of the selector according to FIG. 2 will now be explained, it being supposed that this selector equips a coin- or token-operated telephone apparatus.

If an absent-minded user introduces coins 13 without having previously lifted the handset, the central electronic unit (not shown) is inactive and no polarization voltage is applied on the bimorph element 1 via its connection socket 26, with the result that these coins 13 will therefore cause the flap 17A to pivot and will drop in the evacuation chute 22 and therefore be ejected to the outside, to be restored to the user.

On the contrary, if the user lifts the handset before introducing his/her coins 13 in the telephone apparatus, said central electronic unit (not shown) of this telephone apparatus sends to socket 26 a brief pulse (of the order of 2 to 3 milliseconds' duration) which causes the virtually instantaneous displacement (in about one millisecond) of the bimorph 1 towards its position of deviation towards the left (1A). This bimorph element 1 then serves as anti-pivot support for the flap 17A.

It should be noted that a piezoelectric bimorph plate is a physically remanent element which consequently conserves its deformation 1A for the time necessary for introducing the following coin, but under control of the electronic sorting unit which will confirm the validity of the coin or token by the emission of a pulse validating the position of the bimorph. On the other hand, in the contrary case, a pulse of opposite polarity or a short-circuit of the bimorph element will return it to the position of origin and the coin will be evacuated. It should be noted that the reaction time of the element must be very rapid, since the decision of rejection is taken by the detector which is located some centimeters upstream and the coin or token rolls on slideway 17.

When the user introduces a coin 13 in the apparatus, this coin firstly passes through a conventional recognition device which verifies that this coin is indeed a coin that the apparatus can accept. This recognition device (not shown in the drawing) is placed, on the pathway 14, upstream of the device of FIG. 2.

If this test is positive, i.e. if the incidental coin 13 is acceptable for the apparatus, the central electronic unit controls the bimorph plate 1 so that it then remains in its position of deviation 1A. This may be effected either by sending no electric pulse to socket 26, and it is then considered that the bimorph remains in its deviated position 1A by pure effect of mechanical remanence, or, for greater safety if the user is very slow, by sending to this bimorph a polarization pulse identical to the one which was sent when the handset was lifted.

The coin 13 then rolls normally over the flap 17A and continues its path in the chute 14, towards the receiving device placed downstream.

If, on the contrary, this incidental coin 13 is not recognized as being acceptable, the central electronic unit sends to socket 26 a brief pulse, identical to the preceding one but of opposite sign, or short circuit of the element as described hereinafter.

The bimorph element then returns virtually instantaneously (in about a millisecond) to its starting position 1 where it is disengaged from the pivoting flap 17A. This latter then pivots when the coin 13 reaches it, and the latter is rejected towards the outside via the evacuation chute 22.

These phenomena are repeated in the same way for the following coins. When the user finally replaces the handset, two cases may occur:

- either the last coin was a coin accepted by the apparatus and therefore the bimorph was in position of deviation 1A, in which case the central electronic unit sends to socket 26 a polarization pulse which returns this bimorph into its rest position 1: in that case, the telephone apparatus is therefore immediately reusable,
- or this last coin was a coin rejected by the apparatus, with the result that the bimorph was in its rest position 1 and, in that case, nothing happens since the apparatus is then immediately re-usable ipso facto.

It goes without saying that the invention is not limited to the embodiment which has just been described. For example the piezoelectric element used may be an element other than a bimorph plate, for example a multimorph bar.

What is claimed is:

1. Device for receiving or rejecting coins or circular tokens, comprising:

a runway, inclined with respect to the horizontal and in which the coins or tokens arrive one behind the other after having been tested by a selection member placed upstream and delivering an electric signal for controlling reception or rejection of each coin or token, and a retractable trap forming, at the location of the runway where it is placed, the bottom of said runway, this trap being actuated via a piezoelectric element whose deformation by bending is generated via said electric control signal, with the result that the coins or tokens are directed towards a rejection path when this trap is retracted, while, on the contrary, they continue their path on the runway, beyond this trap, when it has not retracted, i.e. when it remains in rest position, wherein:

said retractable trap is a flap pivoting about a hinge parallel to the runway and returned into its rest position by an elastic member whose return force is less than the weight of a coin or token, and said piezoelectric element is positioned beneath this pivoting flap, perpendicularly to the position of rest of this flap, but so as not to hinder its pivoting when the assembly is at rest and on the contrary so as to slide beneath this flap, in order to serve as support therefor preventing it from pivoting, when it receives a signal controlling reception, while it returns to its rest position, in that case releasing the flap, when it receives a signal controlling rejection.

2. The device of claim 1, wherein this piezoelectric element is a bimorph piezoelectric plate.

3. The device of claim 1, wherein this piezoelectric element is a multimorph piezoelectric bar.

4. The device of claim 1, wherein the runway is constituted by a chute.

5. The device of claim 1, wherein the runway is constituted by a tube.

* * * * *